Sept. 25, 1951 J. F. GORDON 2,569,305

PHONOGRAPH PICKUP MOUNTING

Filed Sept. 5, 1947

Inventor

JAMES F. GORDON

By Robert T. Killman

Attorney

UNITED STATES PATENT OFFICE 2,569,305

PHONOGRAPH PICKUP MOUNTING

James F. Gordon, Towson, Md., assignor to Bendix Aviation Corporation, Towson, Md., a corporation of Delaware Application September 5, 1947, Serial No. 772,233

3 Claims. (Cl. 274—24)

This invention is directed to phonograph pick-ups, more specifically it is directed to a phonograph pick-up mounting that will automatically lift the stylus off of a record that is being reproduced, in the event the tone arm has external pressure applied to it, for example, by falling records, or by mishandling in other ways.

It is quite common in automatic record changers for records to fall from the "stacked" or "loaded" position, between change cycles, consequently exerting a downward pressure on the pick-up arm, driving the stylus into the record being reproduced on the turntable. This results in damage to the stylus and the record that is being reproduced.

Several methods have been devised to protect the stylus and record from external downward pressure. However, these methods entail radical changes in the design of the pick-up arm, and are too expensive to be utilized in this highly competitive field.

It is therefore an object of this invention to provide a pick-up mounting that will automatically afford protection to the stylus and record, in the event records or other objects fall on the pick-up arm.

It is a further object to provide a pick-up mounting that will not contribute to the "needle talk" of the pick-up element.

It is a further object of this invention to provide a vertically flexible mounting for a laterally sensitive pick-up element, and still provide enough lateral stiffness to allow the stylus to drive against the combined mass of the pick-up arm and the pick-up element.

It is a further object of this invention to provide a pick-up element mounting that is inexpensive and easy to manufacture, and which will not require any maintenance, or replacement of worn parts.

The above objects and advantages have been accomplished by the device shown in the accompanying drawing, of which:

Fig. 2 is a view similar to that of Fig. 1, illustrating the manner in which the stylus and record are protected when the pick-up arm is struck from above by falling records, or the like;

Figure 1:
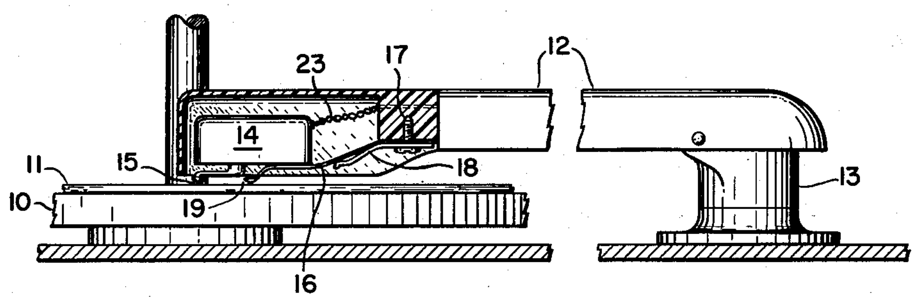
Fig. 1 is a cut-away side view of a pick-up arm incorporating a pick-up element mounting embodying the invention, the mounting being shown in a normal reproducing position.

Referring to the drawing it will be seen that a typical phonograph turntable 10 is illustrated as supporting a record 11. The phonograph is provided with a phonograph pick-up comprising a pick-up arm 12 which is pivotally mounted at the back end to support 13. The free end of arm 12 houses pick-up element 14 which in turn has fastened to its forward end a stylus 15. The said element 14 is mounted at its lower rear extremity to a pick-up element support strap 16, which is fastened at its free end by a screw 17 to the lower side of pick-up arm 12. Also held by the screw 17 is a spring 18 which acts as a resilient stop to limit the downward movement of the mounting strap 16, so that the lower portion of heel 19 just clears the top of the record 11 when stylus 15 is in a normal playing position. The electrical connection to pick-up element 14 is indicated by the reference character 23.

Figure 2:
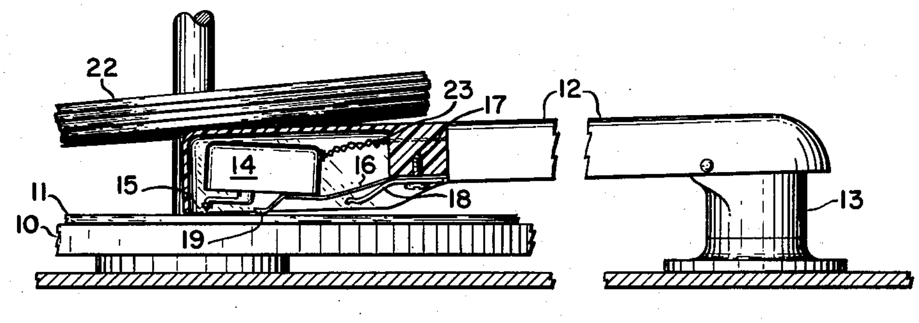

Fig. 1 illustrates the phonograph pick-up arm 12 in a normal reproducing position wherein stylus 15 extends downwardly below the pick-up arm 12, and makes contact with record 11. If records 22, or other objects, fall on the pick-up arm 12, as illustrated in Fig. 2, the pressure exerted causes the said pick-up arm 12 to be pressed downward. The heel 19, which in a normal playing position just clears the top of the recording 11, comes in to contact with the record 11, causing a vertical pressure to be applied to the support strap 16, which in turn causes the pick-up element 14 to tilt upward at its forward end and lift the stylus 15 off of record 11. The lowermost extremity of the heel 19 is large and flat as contrasted to the pointed stylus 15, and therefore does not gouge or otherwise damage the record 11. When the records 22 are removed from the pick-up arm 12, element support strap 16 returns to its normal position, due to its spring action, thus causing the stylus 15 to return to its normal playing position.

Figure 3:
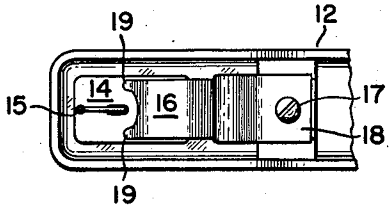
Fig. 3 is a bottom view of the forward end of the pick-up arm shown in Figs. 1 and 2, illustrating the mounting of the pick-up element support; and, Fig. 4 is an exploded view of the pick-up element of Figs. 1 and 2 and its mounting means, illustrating the manner of assembly of the pick-up element to the element support strap.

Fig. 3 illustrates the invention as seen from the bottom of the forward end of the pick-up arm 12, showing spring 18 positioned to act as a resilient stop, limiting downward movement of the strap 16, and shows the position of heel 19 relative to the stylus 15 and mounting screw 17.

Figure 4:
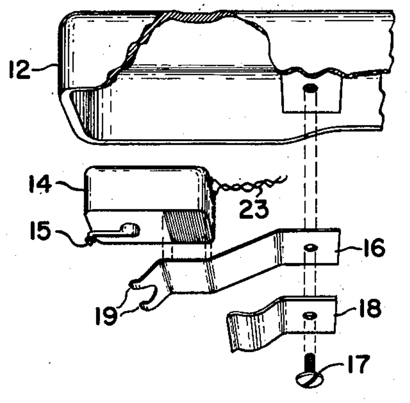

Fig. 4 illustrates an exploded view, wherein the position of the various components with respect to each other are clearly shown. One method of mounting the element 14 to mounting strap 16 is to join the two together by a solder bond as shown by the shaded area at the bottom rear edge of element 14, and front top edge of strap 16. Other means of connection such as screws or rivets can be used.

Due to this "floating" type construction, there results a low mass of material, or minimum weight on the record.

Furthermore, this type of mounting does not contribute to "needle talk" so prevalent with the ordinary pick-up mounting, and there is enough lateral stiffness to allow the stylus to drive against the combined mass of the pick-up arm and the pick-up element.

While the disclosure has been restricted to that form of the invention which is now preferred, many changes and form will occur to those skilled in the art. For example, various means for damping may be employed to keep vertical oscillation of the stylus from being transmitted to the tone arm, such as a coating of damping material on the mounting strap. The heel 19 may be made as wide as the pick-up element, or it may comprise two narrow arms extending downwardly from the bottom and remote edges of the element. Also various resilient arrangements can be employed for restricting the downward movement of the element support strap.

Furthermore the element mounting strap need not be of a resilient material, but could be made of non-flexible material hingedly attached by one end to the pick-up arm and held in a normal reproducing position by means of suitable spring arrangements, so designed as to give, and allow the strap to arcuately revolve around its pivot point, and thus lift the stylus vertically from the record surface, when downward pressure is applied to the pick-up arm.

What is claimed is:

1. In combination a phonograph pick-up arm comprising a pick-up element and stylus, and mounting means for said element and stylus, said mounting means comprising a strap attached at one end to an intermediate portion of said arm and supporting said element and stylus in a position horizontally removed from said one end, said strap being resiliently flexible in a vertical direction means for resiliently limiting the downward movement of the said resilient strap, the remaining end of said strap being free and extending below an intermediate point of said element, said free end lying between said stylus and the point of attachment of said strap to said arm and normally terminating closely above the surface of a phonograph record in reproducing position when said stylus is in contact with said surface, whereby said free end of said strap will be brought into contact with said record by downward movement of said pick-up arm and upon continued downward movement of said pick-up arm said stylus will be raised from said record.

2. In combination, a phonograph pickup arm comprising an elongated portion pivoted at one end about a horizontal axis, the remaining end being free and terminating in a downwardly open housing, a pickup element positioned within said housing, means attaching said element to an intermediate portion of said arm and resiliently supporting said element in a position horizontally displaced from the place of attachment thereof for vertical arcuate movement about said place of attachment, said means comprising a strap having one of its ends terminating intermediate of and below said element, said strap being resiliently flexible in a vertical direction, a stylus carried by said element, said stylus being positioned nearer the free end of said arm and with its point slightly lower than said one end of said strap, whereby, upon the application of force to the top of said arm during the playing of a record, said element will be caused to pivot about said place of attachment to first bring said one end of said strap in contact with said record and then to raise said stylus from contact with said record.

3. In combination a phonograph pickup arm comprising a pickup element and a stylus carried thereby and a mounting means for said element and stylus, said mounting means comprising a strap attached at one end to an intermediate portion of said arm and being attached to the under side of said element, whereby it supports said element and stylus at a location horizontally removed from said one end, said strap being resiliently flexible in a vertical direction, the remaining end of said strap being free and extending downward from an intermediate point of said element, said free end lying between said stylus and the point of attachment of said strap to said arm and normally terminating closely above the surface of a phonograph record in reproducing position when said stylus is in contact with said surface, whereby said free end of said strap will be brought into contact with said record by downward movement of said pickup arm and upon continued downward movement of said pickup arm said stylus will be raised from said record.

JAMES F. GORDON.

REFERENCES CITED

The following references are of record in the file of this patent:

UNITED STATES PATENTS

| Number | Name | Date |
|---|---|---|
| 1,371,635 | Mason | Mar. 15, 1921 |
| 2,032,194 | Wiebusch | Feb. 25, 1936 |
| 2,174,692 | Dunning | Oct. 3, 1939 |
| 2,280,763 | Hasbrouck | Apr. 21, 1942 |
| 2,320,416 | Dally | June 1, 1943 |
| 2,325,343 | Semple | July 27, 1943 |
| 2,331,122 | Jones | Oct. 5, 1943 |
| 2,369,087 | Thompson et al. | Feb. 6, 1945 |
| 2,374,842 | Shively et al. | May 1, 1945 |
| 2,376,456 | Sinnett | May 22, 1945 |
| 2,455,913 | Bauer | Dec. 14, 1948 |
| 2,475,785 | Jensen | July 12, 1949 |